[11] 3,581,646

| [72] | Inventors | Allan M. Saunders<br>San Mateo;<br>Ronald J. Fleming, San Jose, both of, Calif. |
|---|---|---|
| [21] | Appl. No. | 744,414 |
| [22] | Filed | July 12, 1968 |
| [45] | Patented | June 1, 1971 |
| [73] | Assignee | Technical Operations, Incorporated<br>Burlington, Mass. |

[54] FAST-ACTING TUBULAR SHUTTER
9 Claims, 9 Drawing Figs.
[52] U.S. Cl. .................................................. 95/53,
  95/53.3, 95/58, 350/275
[51] Int. Cl. .................................................. G03b 9/08
[50] Field of Search............................................95/53, 53.3,
  58; 350/269, 270, 271, 272, 273, 274, 275

[56] References Cited
UNITED STATES PATENTS
1,569,139  1/1926  Pigeon........................  95/58X

*Primary Examiner*—Samuel S. Matthews
*Assistant Examiner*—Monroe H. Hayes
*Attorneys*—Alfred H. Rosen and John H. Coult ABSTRACT: A cylindrical tube is rotatable about its axis and is provided with diametrically arranged slits for registering with a slit in a mask for allowing a beam of light to pass for a selected period of time. The shutter is driven by a cylindrical torsion spring and apparatus is provided for varying the time delay before opening, the rate of travel during opening, and the shutter open time.

Patented June 1, 1971
3,581,646
3 Sheets-Sheet 1
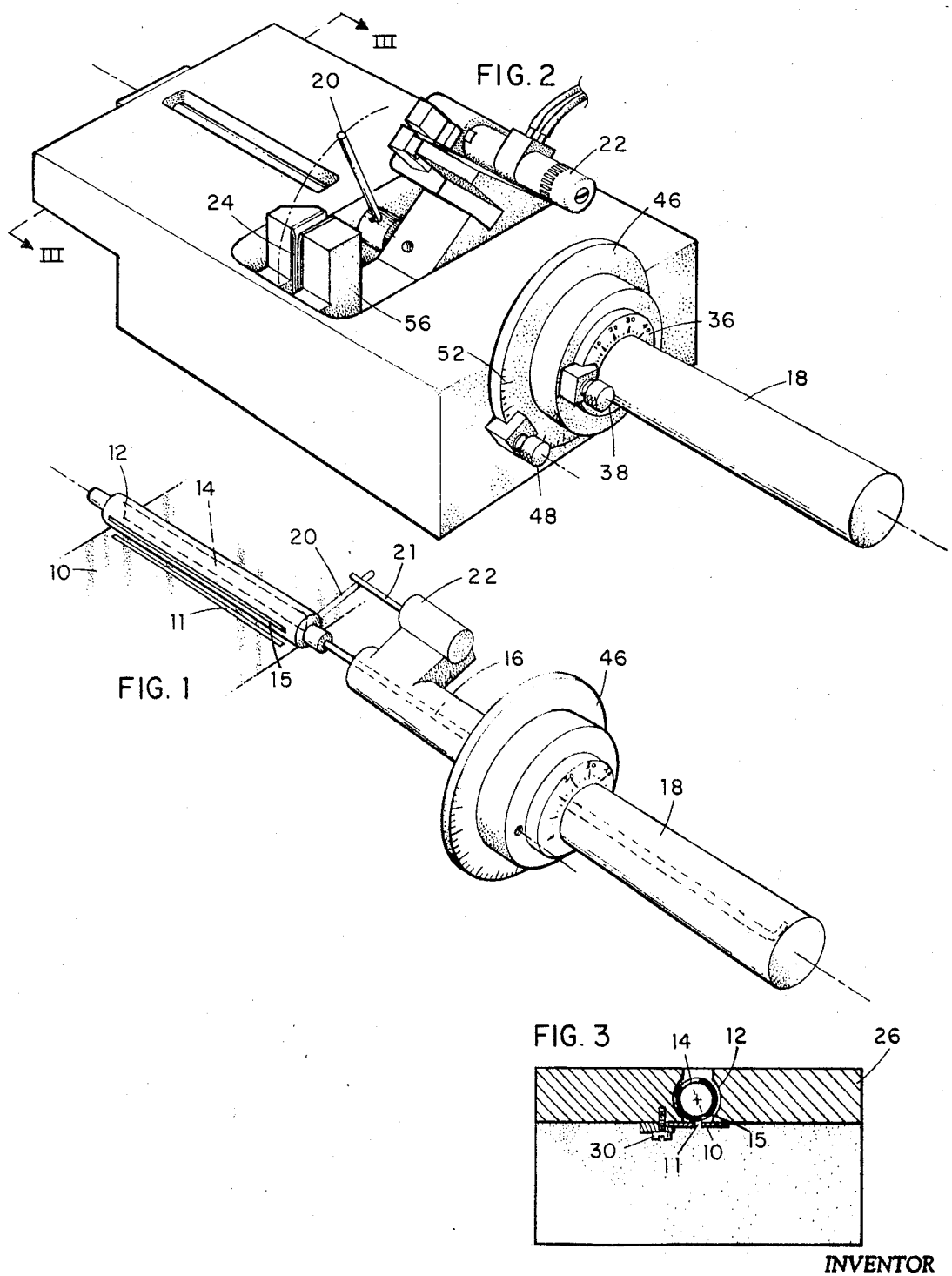
INVENTOR
RONALD J. FLEMING
BY: ALLAN M. SAUNDERS

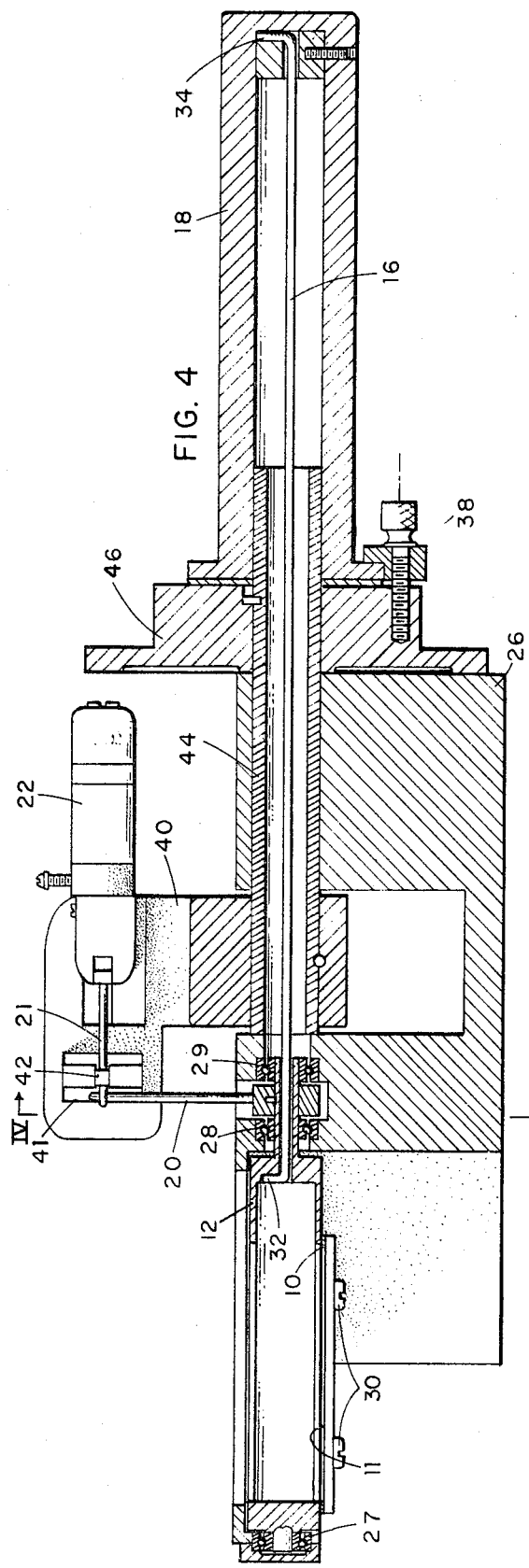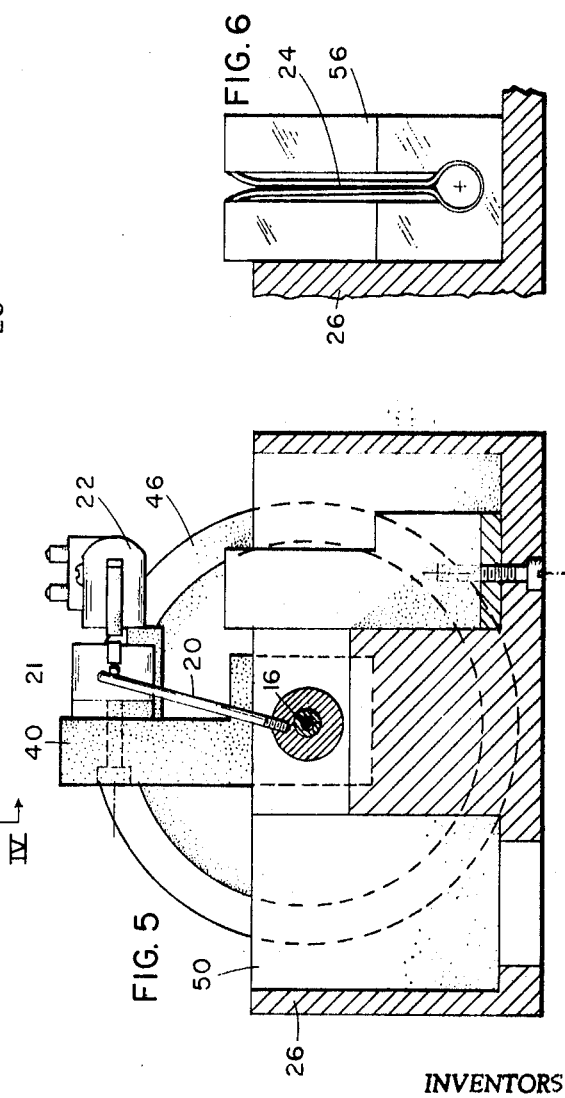

Patented June 1, 1971

INVENTORS

RONALD J. FLEMING
ALLAN M. SAUNDERS

FAST-ACTING TUBULAR SHUTTER

BACKGROUND OF THE INVENTION

The devices of the present invention will have many uses for shuttering or metering a beam of energy, but will be described herein as being employed for the purpose of exposing a photographic film to a beam of light carrying the image of a rapidly changing or moving object. Various types of missiles and rockets are tested and observed without being launched on a device known as a rocket sled which operates on a straight track and is capable of achieving very high speeds. To photograph a rocket in motion on a sled, a camera is mounted beside the track and the shutter is opened to expose the film at the precise time that the rocket is within the field of view of the camera. Since the entire time in which it is possible to record the event is measured in a few microseconds, the timing of the opening and closing the shutter is extremely critical if a record of the event is to be made.

In the present application, the shuttering mechanism is illustrated in a very simple schematic form entirely apart from a camera or optical system, the invention residing in the shuttering mechanism per se.

The shutter concepts of this invention are an improvement over prior art tubular shutters, typified by those shown in U.S. Pat. Nos. 388,850–Eastman, 526,471–Waters, 2,942,646–Kaeburn, and 2,053,966–May.

OBJECTS OF THE INVENTION

It is the object of the invention to provide fast and dependable shuttering mechanisms capable of simple adjustment of lead time before opening, opening rates, and open times.

Further objects and advantages of the invention will in part be obvious and will in part become apparent as the following description proceeds.

The features of novelty which characterize the invention will be pointed out with particularly in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is a schematic view in perspective illustrating the basic operation of a shutter designed in accordance with the present invention;

FIG. 2 is a perspective view of one form that the shutter mechanism may assume in practice;

FIG. 3 is a sectional view taken on the Line III–III of FIG. 2;

FIG. 4 is a longitudinal sectional view of the device shown in FIG. 1;

FIG. 5 is a section taken on the Line IV–IV of FIG. 4;

FIG. 6 is a fragmentary view illustrating construction of an energy absorbing device;

DESCRIPTION OF THE PREFERRED EMBODIMENTS

Figure 7:
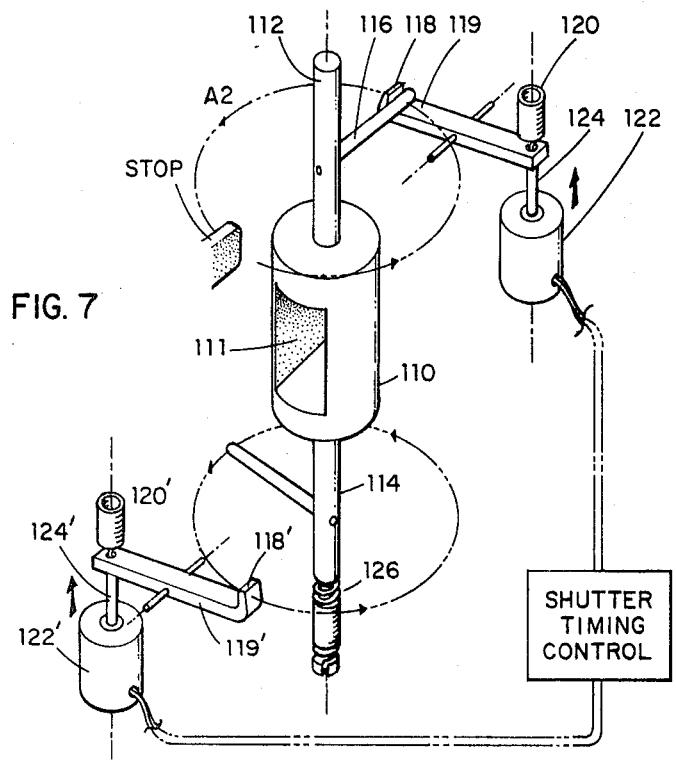
FIG. 7 is a schematic view in perspective of another shuttering mechanism embodying the present invention.

FIGS. 1—6 illustrate an embodiment of the invention implementing the general principles of the present invention. In this view a mask 10 is shown as being provided with a slit 11 which serves to admit a beam of light into a camera. Shuttering means in the form of a thin lightweight metal cylinder 12 in the position shown prevents passage of light through the slit 11. The cylinder is provided with two slots on its opposite sides, one being shown in dotted lines at 14 and the other in a diametrically opposed position at 15. A torsion spring 16 provides a torque which tends to rotate the cylinder in a counterclockwise direction so that the slots 14 and 15 may be momentarily aligned with the slit 11 in mask 10 to permit passage of light. In accordance with this invention, the spring preferably comprises a resilient solid cylindrical rod suitably secured to the cylinder 12 at one end and to the inner end of a tube 18 at the other end so that upon cocking rotation of the tube, energy is supplied to and stored in the spring 16.

The amount of energy supplied, and thus the speed at which the cylinder 12 will rotate when released, depends upon the amount of initial angular displacement imparted to the tube 18. When a selected displacement is imparted to the tube, locking means are provided to prevent it from rotating in a reverse direction, as will be presently described in greater detail.

A trigger for tripping the shutter upon command may comprise a solenoid armature 21, driven by magnetic flux generated within a coil 22, which retentively engages an arm 20 extending radially from the cylinder 12. When the solenoid is energized, the armature 21 is drawn inwardly, releasing the trigger arm 20. Energy stored in the spring 16 rotates the cylinder 12. After the slits 11, 14 and 15 have passed through their position of registry to permit the passage of light, the trigger arm 20 is received in an energy-absorbing device, illustrated in the form of a spring clip 24, which brings the cylinder to rest and prevents rebound which might result in a double exposure. The clip 24 comprises a pair of spring members joined at one end with free ends biased together to provide a normally closed friction-generating channel for receiving the trigger arm 20.

The speed of rotation of the cylinder 12 is determined in part by the energy stored in spring 16 and also by the position of the armature 21. The position of the armature 21 relative to the open position of the cylinder 12, herein termed the lead angle, also provides a time delay between energization of the solenoid 22 and actual opening of the shutter by registration of the several slits. The lead angle can be varied by turning the block 40. The ability to vary the lead angle and the spring load independently of each other enables perfect synchronization between opening of the shutter and initiation of an event which might also have a brief period between its triggering and its actual occurrence.

In FIGS. 2 to 5 inclusive, the structure illustrated in FIG. 1 is shown as mounted in a housing 26. The cylinder 12 is shown supported in ball bearings 27, 28, and 29 to provide a low-friction support and the mask 10 with its slit 11 (best shown in FIG. 3) is clamped to the housing beneath the cylinder by screws 30. The spring wire 16 is shown in FIG. 5 as being anchored within the cylinder 12 at 32 and within the tube 18 at 34. When the tube is rotated to tension the wire, the angle of rotation may be read on a scale shown at 36 in FIG. 2. A clamping mechanism 38 (FIGS. 2 and 4) serves to retain the spring under tension.

The solenoid 22 controlling the armature 21 is carried on a supporting block 40 which also carries a slotted block 41 with a small antifriction roller 42 which reduces friction when the armature 21 is withdrawn. The block 40 is nonrotatably secured to a tube 44 rotatable in the housing and having a control dial 46 secured thereto. The dial may be rotated to move the block 40 and its trigger mechanism to any desired lead angle at which it may be secured by a clamping device shown at 48. Thus, the position of the block may be varied between the vertical position illustrated in FIGS. 4 and 5 through the angularly disposed position shown in FIG. 2 and to a completely horizontal position (not shown) where it is received in a suitable recess 50 in the housing. A scale 52 is provided at the edge of the disc 46 to enable repeated setting of the dial at any given point. The energy-absorbing device 24 is shown as supported in a slotted block 56 (see FIG. 6) and assumes the form of a leaf spring or springs positioned to gradually bring the trigger arm 20 to a stop and frictionally retain it against rebounding.

Figure 8:
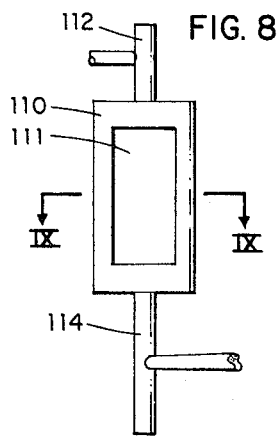
FIG. 8 is a view in elevation of a part of the shuttering mechanism shown in FIG. 1 shown as though it had been rotated 90° from the position shown in FIG. 1.
Figure 9:
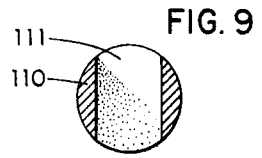
FIG. 9 is a sectional view taken on the Line IX–IX of FIG. 8.

Another embodiment of the inventive concepts is illustrated in FIGS. 7—9.

A shuttering cylinder 110 is illustrated as having an aperture 111 extending therethrough so that with the cylinder 110 in one position, a beam of light may be passed through the aperture, while in a position rotated through 90° in either direction light is blocked. The cylinder 110 is formed with trunnions 112 and 114 at its opposite ends and a triggering mechanism is associated with each trunnion. As shown in FIG. 7, the upper trunnion has a trigger pin 116, a sear 118 on a pivoted lever 119, the lever being urged to the position shown where the sear 118 obstructs the trigger pin by a spring 120 under compression. The pin 116 is releasable by the action of an armature 124 of a solenoid 122. A torsion spring 126 imparts rotation to the cylinder. Prior to operation, the cylinder and trunnions are rotated in a direction opposite to the arrow shown in FIG. 7 to preload the spring 126 to a desired condition. When the solenoid is energized, the shutter is released momentarily and stopped by a second triggering mechanism with parts identical to those of the first and associated with the trunnion 114.

The parts of the second triggering mechanism have reference characters identical to those of the other triggering mechanism but primed. The second triggering mechanism is arranged to stop the shutter at 90° from its starting position, where it is open, and to permit the shutter to remain open until the solenoid 122' is energized to release the trigger pin 116'. This permits a second 90° rotation of the shutter to its closed position where it is stopped by the pin 116 abutting against a stop at 180° from the sear 118. Any suitable stop means may be associated with the levers 119 to limit the motion imparted to them by the springs, or they may be retained in the normal position by contact with the armatures of the solenoids.

An advantage of the two solenoids which serve to open and close the shutter is that they are easily triggered by various types of events, and particularly in the event described where a sled carries a rocket or the like, the sled upon approaching the field of view of the camera can break a wire which, through a suitable circuit, will energize the solenoid 122 and as it leaves the field of view break a second wire to energize the solenoid 122'. Since the shutter cylinder 110 rotates only 180° during the occurrence of an event, no double exposure will occur. As pointed out above, various types of cameras may be used with the shuttering device disclosed herein, and either a streak or framed exposure may be made during the brief period of time that the shutter is in its open position.

The invention is not limited to the particular details of construction of the embodiments depicted, and it is contemplated that various and other modifications and applications will occur to those skilled in the art. Certain changes may be made in the above-described process without departing from the true spirit and scope of the invention herein involved; it is intended, therefore, that the subject matter of the above depiction shall be interpreted as illustrative and not in a limiting sense.

What we claim is:

1. A photographic shutter, comprising:
   a generally cylindrical opaque shuttering means mounted for rotation about its longitudinal axis, said means having diametrically opposed openings therein for passing a substantially unattenuated beam of light directed transverse to said longitudinal axis;
   torsion spring means connnected to said shuttering means for driving said shuttering means, said torsion spring means comprising a resilient solid cylindrical rod disposed coaxially with said shuttering means and adapted to be torsionally loaded;
   variable loading means for adjusting the initial load on said springs means; and
   triggering means including catch means for retentively engaging said shuttering means in a light blocking position and tripping means for disengaging said catch means upon actuation thereof.

2. The shutter defined by claim 1 including indicating means cooperating with said variable loading means for providing an indication of the magnitude of said initial load on said spring means established by said variable loading means.

3. A photographic shutter, comprising:
   a generally cylindrical opaque shuttering means mounted for rotation about its longitudinal axis, said means having diametrically opposed openings therein for passing substantially unattenuated a beam of light directed transverse to said longitudinal axis;
   torsion spring means connected to said shuttering means for driving said shuttering means;
   variable loading means for adjusting the initial load on said spring means;
   triggering means including catch means for retentively engaging said shuttering means in a light blocking position and tripping means for disengaging said catch means upon actuation thereof; and
   adjustable trigger mounting means mounted for rotation about said longitudinal axis of said shuttering means including securing means for locking said catch means in a selected angular position determinative of the magnitude of the delay between tripping of said catch means and opening of said shuttering means.

4. The shutter defined by claim 3 including delay indicating means cooperating with said trigger mounting means for providing an indication of the magnitude of said delay.

5. The shutter defined by claim 3 including indicating means cooperating with said variable loading means for providing an indication of the magnitude of said initial load on said spring means established by said variable loading means.

6. The shutter defined by claim 5 wherein said torsion spring means comprises a resilient solid cylindrical rod disposed coaxially with said shuttering means and adapted to be torsionally loaded.

7. The shutter defined by claim 6 including delay indicating means cooperating with said trigger mounting means for providing an indication of the magnitude of said delay.

8. The shutter defined by claim 7 wherein said cylindrical shuttering means has a radial arm engageable by said catch means and wherein said shutter includes energy dissipating means positioned to receive said trigger arm after release thereof, said energy dissipating means comprising a pair of spring members joined at one end with free ends biased together to provide a normally closed friction-generating channel for receiving said trigger arm.

9. A photographic shutter comprising:
   a generally cylindrical opaque shuttering means mounted for rotation about its longitudinal axis, said means having diametrically opposed openings therein for passing substantially unattenuated a beam of light directed transverse to said longitudinal axis;
   torsion spring means connected to said shuttering means for driving said shuttering means, said torsion spring means comprising a resilient solid cylindrical rod disposed coaxially with said shuttering means and adapted to be torsionally loaded;
   first triggering means including first catch means for retentively engaging said shuttering means in a light blocking position and first tripping means for disengaging said first catch means upon actuation thereof; and
   second triggering means including second catch means for engaging and stopping said shuttering means in a light unblocking position wherein said diametrically opposed openings are aligned with the light paths, said second triggering means including second tripping means for disengaging said second catch means upon actuation thereof.